United States Patent Office 3,515,240
Patented June 2, 1970

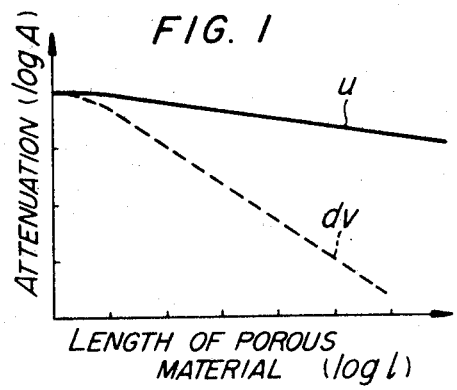
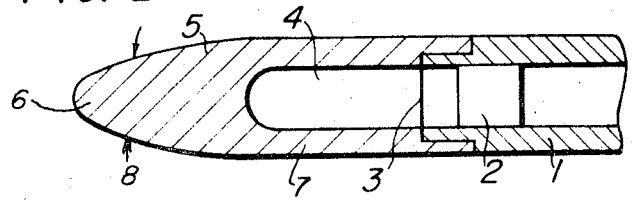
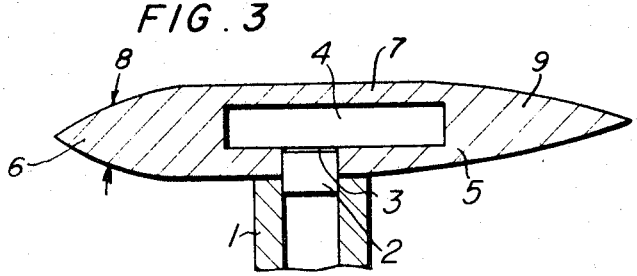
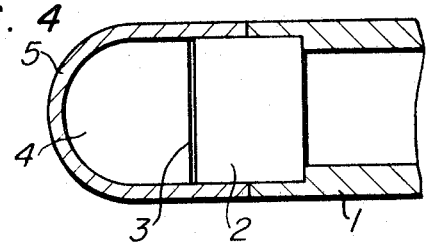

3,515,240
MICROPHONE DEVICE
Akira Sugiyama, Nara-shi, Tadami Tanaka and Rimpey Matsumoto, Hirakata-shi, and Yasuhiro Riko, Yokohama, Japan, assignors to Matsushita Electric Industrial Co., Ltd., Kadoma-shi, Osaka, Japan, a corporation of Japan
Filed Sept. 23, 1968, Ser. No. 761,766
Claims priority, application Japan, Sept. 28, 1967, 42/62,937, 42/62,938, 42/62,939, 42/62,940, 42/62,941, 42/62,942
Int. Cl. G10k 13/00; H04r 1/02
U.S. Cl. 181—31      5 Claims

ABSTRACT OF THE DISCLOSURE

A microphone device having a microphone cover of such an external shape that it is elongated in the direction of an air stream and its diameter varies continuously along the direction of the airflow. The cover is provided with an internal cavity in which the diaphragm of the microphone is exposed so that a pressure variation in the audible frequency range due to a variation in the wind velocity can sufficiently be attenuated to permit measurement of sound pressure in the air stream.

---

This invention relates to microphone devices and more particularly to a microphone device which can measure a sound wave alone even when the microphone is placed in a field in which the sound wave coexists with a flow of air.

Covers known by the trade name "Nose Cone" and "Wind Screen" are two general types of wind shielding members used with conventional microphone devices, which have the same objects as the present invention. The conventional microphone devices provided with these covers have been defective in that turbulence takes place in a flow of air passing thereby due to a fault in the hydrodynamic shape of the device. Another defect has been that the wind shielding member has insufficient resistance against the flow of air passing past the device. Because of the above defects, the influence of wind appears even with a low wind velocity of the order of 10 meters per second and it has been difficult to reduce the noise level in the output from the microphone, at this wind velocity, to below 70 decibels in terms of sound pressure (0 decibel= $2 \times 10^{-4} \mu$ bar). On the other hand, an attempt to increase the resistance of the wind shielding member against an airflow for the purpose of improving the noise level in the output from the microphone results in a variation in the frequency characteristics as well as in the sensitivity of the microphone itself since enough bases for the design of the wind shielding screen or cover have not been established hitherto. The above attempt also results in complexity of structure, which results inevitably in an increase in costs and in susceptibility to mechanical damage. Thus, it is very difficult to effectively eliminate the undesirable influence of the airflow, and as a matter of fact, the microphone devices presently in use which are equipped with the covers described above are only usable for a limited low wind velocity range of less than 4 or 5 meters per second.

It is therefore a primary object of the present invention to provide a novel and improved microphone device which eliminates the foregoing conventional drawbacks and is able to easily detect the acoustic signal in the case of a wind having a high velocity.

Another object of the present invention is to increase the resistance of the cover member against an airflow so as to more effectively attenuate the pressure due to a fluctuation of the velocity of an airflow for the successful measurement of a sound wave alone.

A further object of the present invention is to provide a microphone device which can detect a sound wave alone even in a field in which the sound wave coexists with an airflow and which has high mechanical strength and high resistance to heat and corrosion.

The above and other objects, features and advantages of the present invention will be apparent from the following detailed description of a few embodiments thereof taken in conjunction with the accompanying drawings, in which:

FIG. 1 is a graph illustrating the basic idea of the present invention;

FIG. 2 is a sectional view of part of an embodiment of the present invention;

FIG. 3 is a sectional view of part of another embodiment of the present invention; and FIG. 4 is a sectional view of part of a further embodiment of the present invention. At first, the basis for the design of the cover member will be fully discussed for the purpose of attaining the objects described above, thereby providing a microphone device which shows excellent operating characteristics despite a very simple structure and is satisfactorily usable for a high wind velocity range up to about 50 meters per second.

Noises are delivered from a microphone when the microphone is placed in a flow of air. One of the factors giving rise to the noise is a spurious sound wave or undesired sound contained in the airflow, while another cause giving rise to the noise is a fluctuation of the velocity of the airflow or moving air. It is considered that such a fluctuation of the wind velocity generates a variation in the pressure in an audible frequency range and such a pressure variation is sensed by the microphone.

A microphone is generally unable to completely distinguish the pressure variation in the form of an undesired sound from the pressure variation due to the fluctuation of the wind velocity, and thus both these pressure variations are detected as noises of the microphone and appear as an increase in noise level in the output from the microphone. In order therefore to reduce the noise level in the output from the microphone placed in a flow of air, it is absolutely necessary that the microphone proper placed in the airflow does not create or increase turbulence of the airflow, hence the undesirable pressure variation in the airflow, and that any pressure variation component which has already been existing in the airflow or which is created or increased due to insertion of the microphone in the airflow is prevented from reaching the surface of the diaphragm of the microphone.

On the basis of the indispensable conditions specified above, the present invention intends to provide a microphone device of streamlined shape thereby preventing occurrence of a turbulent flow due to the microphone proper. Furthermore, according to the present invention, the difference between the physical properties of pressure variations in sound and airflow is positively utilized to effectively separate the sound from the airflow thereby preventing the pressure variation involved in the airflow from being transmitted to the surface of the diaphragm of the microphone.

A pressure variation in a flow of air is generally given by the equation of fluid motion, $P_f = \rho \cdot v \cdot \delta v$, where $P_f$ is the amount of pressure variation in a flow, $\rho$ is the density of a medium, and $v$ and $\delta v$ are the mean velocity and velocity variation of the flow, respectively. Further, as is commonly known, a sound pressure $P_a$ is given by the equation, $P_a = \rho \cdot c \cdot u$, where $\rho$ is the density of a medium, $c$ is the velocity of sound and $u$ is the velocity of particles of the medium.

While both are phenomenally similar to each other inasmuch as they are a pressure variation, basically the former $P_f$ is a pressure variation which propagates with the velocity of wind and the latter $P_a$ is a pressure variation which propagates with the velocity of sound. Suppose that the magnitudes of both these pressure variations are the same, then this means that the velocity variation $\delta v$ in the former is $c/v$ times the velocity $u$ of particles in the latter.

Consider now the degree of attenuation when both these pressure variations propagate through a porous material. In the case of the sound pressure, the greater portion of the attenuation of the sound pressure is caused by the friction with the solid wall surface of the porous material and with the solid wall of the pores formed by said material. In the case of the airflow, the influence of the viscosity of air on the attenuation of the pressure variation in the airflow is not negligible, and two types of attenuation take place. In other words, the turbulence itself is subject to attenuation because of the viscosity of air, and at the same time, attenuation is also caused by the friction with the solid wall surface of the porous material and with the solid wall of the pores formed by said material. Therefore, the amount of attenuation of the pressure variation imparted by the porous material, that is, the coefficient of resistance is far larger in the case of the airflow than in the case of the sound pressure.

The above fact is clearly known from FIG. 1 in which it will be seen that the amount of attenuation of pressure variation per unit length of a porous material is greater in the case of an airflow (dotted line) than in the case of a sound wave (solid line). The difference therebetween becomes increasingly greater as the traveling distance within the porous material becomes longer. The difference in the degree of attenuation can freely be determined by suitably selecting the porous material. It will be seen therefore that the difference in the attenuation characteristics for $u$ and $\delta v$ in FIG. 1 may be positively utilized for the effective separation of the pressure variation in the sound wave from the pressure variation in the airflow. The separation can be effected by selectively employing a suitable porous material which has its attenuation characteristics on the right-hand side of the intersection of the two lines.

From the above description it will be understood that the present invention is based on the finding that there is a marked difference between the physical properties of pressure variations in a sound wave and an airflow. In the present invention, a suitable porous material giving a large difference between the amounts of attenuation of the sound wave and the airflow over a wide frequency range is selected to make a cover member, and an internal cavity is provided in the cover member of porous material in order to adjust the wall thickness of the cover member to ensure the most effective separation characteristics and serve as an acoustic compensatory circuit for compensating for the sound pressure reduction in a high-frequency range caused during the time the sound wave is passing through the body of the porous material depending on the specific application. In the present invention, the cover member has a stream-lined external shape so as to enhance the above effect more. A slight turbulence in the airflow will be inevitable even with the streamlined external shape of the cover member and the turbulence will be most marked at the front end of the cover member. In order to obtain the best results, it is preferable that the equivalent transmission distance ranging from the front end to the interior of the cover member, that is, the wall thickness at that portion of the cover member has a maximum dimension.

An embodiment of the present invention will now be described with reference to FIG. 2. The microphone device comprises a cylindrical support member 1 of a material such as a metal, plastic or like solid material, and a microphone 2 screw-fastened, snugly fitted or otherwise fixed within the cylindrical support member 1. The diaphragm 3 of the microphone 2 is disposed in the open front end of the cylindrical member 1. A cover member 5 of porous material such as glass fibers cemented together by a binder has a streamlined front end and is suitably coupled to the cylindrical member 1. Thus, the cover member 5 has a variable outer diameter section 8 whose diameter varies continuously along the direction of the airflow. The cover member 5 has a front end portion 6, a side wall portion 7 and an internal cavity 4 which acts to give the optimum attenuation for the most effective separation of an airflow from a sound wave. The internal cavity 4 has a suitable volume depending on the desired wall thickness of the cover member 5, serves as a traveling path of the sound wave, and forms a part of a sound compensation circuit for compensating for an undesirable reduction in sound pressure in a high frequency range due to an internal loss or the like occurring in the material forming the cover member 5. Accordingly, the size of the cavity 4 should be determined depending on the wall thickness of the cover member 5 which thickness is required to attain the optimum attenuation by the specific material forming the cover member 5. Another point that should be taken into consideration in determining the size of the cavity 4 is the acoustic characteristics of the device when used as a conventional microphone.

In the illustrated embodiment, the cover member 5 is formed by binding glass fibers having a fineness of 6 microns with a phenol resin binder, for example. The internal cavity 4 of the cover member 5 has a diameter which is more than ⅕ the maximum outside diameter of the cover member 5.

With such a structure, the amount of attenuation of pressure variation in an airflow can be made about one hundred times that for a sound pressure, and the noise level in the output from the microphone resulting from pressure variation in the airflow with a wind velocity of 10 meters per second can be reduced below 20 decibels in terms of sound pressure over the entire audible frequency range.

Steel wool which is featured by its high mechanical strength, rock wool which is featured by its inexpensiveness, and other plastic material may be singly or jointly used to form the cover member 5. Through suitable selection of these materials and of the optimum wall thickness, it is possible to further improve the degree of attenuation of pressure variation in the airflow.

Fibers of plastic or like material may be cemented together by a binder or networks of such fibers may be cemented together by a binder to make a porous body, from which the cover member 5 may be made. In the cover member 5 employing such a material, complex and long passages are provided by the many pores extending through the body, and as a result, a high resistance against a flow thereby provided is effective for a further reduction in the amount of attenuation of pressure variation in the airflow. The use of such a material is also preferred since the wall thickness of the cover member 5 can freely be determined.

Referring to FIG. 3, there is shown another embodiment of the present invention in which like reference numerals are used to denote like parts appearing in FIG. 2. Numeral 9 designates a backward end portion of the cover member. A cover member 5 in this embodiment is formed from resin particles of spherical or irregular shape which are bound together by a chemical method at the points of contact therebetween. In one form of the cover member 5, an article such as the one sold under the trade name "Pealcomb" is employed which is made by chemically binding spherical particles of a copolymerized thermoplastic resin having a mean diameter of 0.1 to 0.5 millimeter. The article is shaped at its exterior as a streamlined contour and an internal cavity 4 is provided substantially centrally of the cover member 5. A microphone 2 is disposed in the cavity 4 so that its diaphragm 3 is exposed to the cavity 4. The diaphragm 3 of the microphone 2 exposed in the cavity 4 is covered at its front surface with a thin silk or nylon cloth so as to improve the attenuation characteristics for pressure variation due to an airflow and to enhance the sound compensating function of the device when used as a conventional microphone. Although the cover member 5 is shown as coupled to a cylindrical support member 1 at right angles with respect to each other, it will be understood that the angular position of the cylindrical member 1 relative to the cover member 5 may be freely selected including an inclination of 45° and a parallel disposition.

In this embodiment too, the amount of attenuation of pressure variation in an airflow by the cover member 5 is more than one hundred times that for a sound pressure as in the embodiment of FIG. 2, and a notable feature is the small overall size of the cover member 5.

By virtue of the use of the body made by chemically bonding fine resin particles, the cover member 5 has a comlex porous structure, and because of the long pore passages, air encounters a high resistance so that the pressure variation in the airflow can be subjected to a higher degree of attenuation. Moreover, the resistance against a flow can easily be controlled because the size of the pores can be controlled by the size of the particles. It will be understood further that the various materials described in the embodiment of FIG. 2 may be employed to form the cover member 5. Furthermore, fine particles of a resin having a mean diameter of the order of several microns may be mixed with a phenol resin or like binder and compression molded to obtain a body having sufficient air permeability. Such a body, when used to form the cover member, shows a higher degree of airtightness than the material of the cover member described previously and can improve the degree of attenuation for pressure variation per unit length.

Referring to FIG. 4 there is shown a further embodiment of the present invention in which like reference numerals are used to denote like parts appearing in FIG. 2. FIG. 4 shows a sectional view of part of a microphone device in which a microphone is covered by a cover member having thereon a sprayed film. The microphone device comprises a cylindrical support member 1 of a material such as a metal, plastic or like solid material, and a microphone 2 screw-fastened, snugly fitted or otherwise fixed within the cylindrical support member 1. The diaphragm 3 of the microphone 2 is disposed in the open front end of the cylindrical member 1. Coupled to the cylindrical member 1 is a cover member 5 which is shaped in its external contour as so-called streamlined and has an internal cavity 4 in which the diaphragm 3 of the microphone 2 is exposed.

The cover member 5 may be made by pre-forming a fibrous glass material to the shape, and spraying a molten metal onto the surface of the molded body of the fibrous glass material from a spray nozzle which is disposed at a distance of more than 50 millimeters from the body so as to deposit a sprayed metal film having a porosity of more than 30%. Furthermore, the cover member 5 may be made by pre-forming a body of predetermined shape from a porous material, heating to melt a material such as a metal, plastic or ceramic material, and spraying the molten material onto the surface of the molded body to deposit a sprayed film of porous material thereon. In another case, the cover member 5 may be made by directly spraying a molten material into a mold to form a sprayed film of porous material, molding a porous material to the shape of the cover member, and then removing the mold to obtain a molded body having thereon the sprayed film of porous material with a thickness of more than 0.1 millimeter. The wall thickness of the cover member 5 should be determined depending on the the degree of attenuation of pressure variation in an airflow whose transmission rate is variable depending on the porosity of the sprayed film, resistance against flow and other factors. A further consideration to be taken in determining the wall thickness of the cover member 5 is the acoustic characteristics of the material forming it.

With such a structure, the amount of attenuation of pressure variation in an airflow can be made about one hundred times that for a sound pressure, and the noise level in the output from the microphone resulting from pressure variation in the airflow with a wind velocity of 10 meters per second can be reduced below 20 decibels in terms of sound pressure over the entire audible frequency range.

It will be understood from the above description that the device of FIG. 4 can accurately detect a sound wave alone in a field in which the sound wave coexists with an airflow. The device is based on the finding that the physical properties of pressure variation in the airflow differ from the physical properties of pressure variation in the sound wave and thus utilizes the difference in the propagation characteristics, hence the attenuation characteristics of the sound wave and the airflow when they pass through a sprayed porous film of material such as a metal, ceramic or plastic material. According to the present invention, the pressure variation caused in the airflow due to a turbulent flow created by the cylindrical member including the microphone therein and by the cover member can distinctly be separated from pressure variation in the sound wave because the cover member has a streamlined external shape. By virtue of the above feature, the microphone device according to the present invention is satisfactorily practically usable in an airflow with a wind velocity as high as about 50 meters per second. It will be appreciated that the microphone device has high mechanical strength and high resistance to heat and corrosion because it is made from a metal, ceramic, plastic or like material.

What is claimed is:

1. A microphone device comprising a cover member enclosing a cavity which acts as an acoustical compensating component in a high-frequency range, and a microphone disposed within said cavity in such a manner that the diaphragm of said microphone is exposed in the space defined by said cavity, said cover member having such an external shape that is elongated in the direction of airflow and has a circular cross-section whose diameter continuously varies in the direction of airflow, the wall thickness of the front end portion of said cover member upon which the airflow impinges being larger than that of the side wall portion thereof extending longitudinally along the cavity, and said cover member being made of a porous structure.

2. A microphone device according to claim 1, wherein said cover member of porous structure is made of chemically bonded fine particles whose average diameter is in the range of 0.1 to 0.5 millimeter.

3. A microphone device according to claim 2, wherein said porous structure is made of a porous mass sprayed with a thermally fusible material.

4. A microphone device according to claim 2, wherein said porous structure is made of a fibrous material which is bound and solidified.

5. A microphone device according to claim 2, wherein said porous structure is made of a material braided and solidified into a network structure.

References Cited

UNITED STATES PATENTS

| | | | |
|---|---|---|---|
| 2,207,823 | 7/1940 | Ryan | 179—184 |
| 2,520,706 | 8/1950 | Anderson et al. | 181—33 |
| 2,556,168 | 6/1951 | Cragg et al. | 179—184 |
| 3,154,171 | 10/1964 | Knutson et al. | 181—31 |
| 3,265,153 | 8/1966 | Burroughs | 181—31 |
| 3,381,773 | 5/1968 | Schenkel | 181—31 |
| 3,432,002 | 3/1969 | Cohen | 181—31 |

STEPHEN J. TOMSKY, Primary Examiner

U.S. Cl. X.R.

179—184; 181—33